March 23, 1965 R. WICK ETAL 3,174,374
DEVICE FOR CUTTING STRIPS AT SELECTED INTERVALS
Filed Sept. 6, 1960 4 Sheets-Sheet 1

INVENTOR.
RICHARD WICK
RUDOLF PAULUS
ALBERT NIEDERMEIER
BY
Michael S. Striker
Attorney

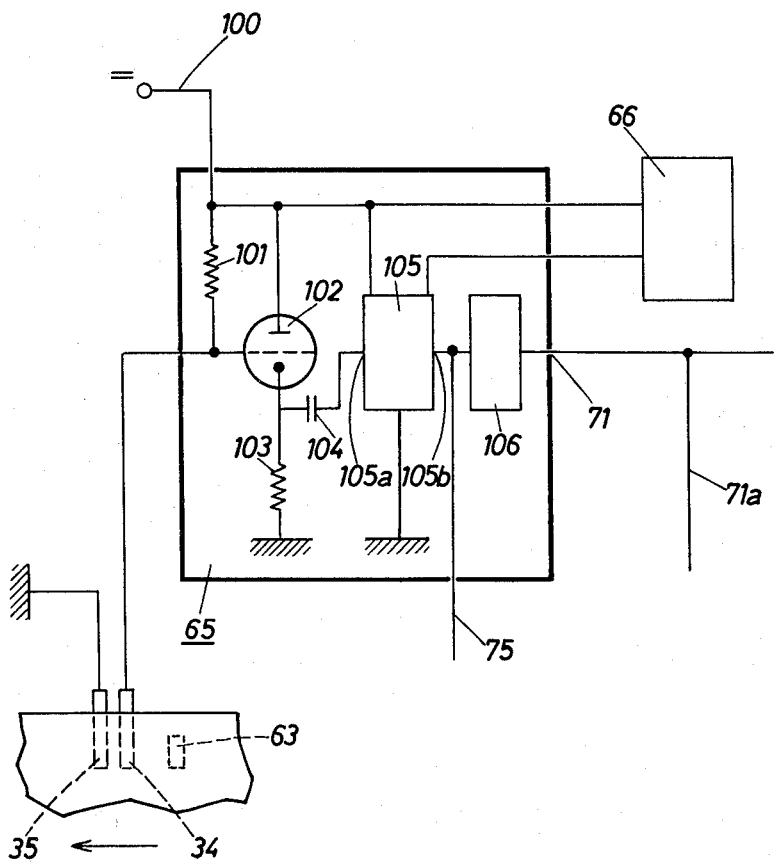

United States Patent Office 3,174,374
Patented Mar. 23, 1965

3,174,374
DEVICE FOR CUTTING STRIPS AT SELECTED
INTERVALS
Richard Wick, Grunwald, near Munich, and Rudolf
Paulus and Albert Niedermeier, Munich, Germany,
assignors to Agfa Aktiengesellschaft, Leverkusen-
Bayerwerke, Germany
Filed Sept. 6, 1960, Ser. No. 54,194
Claims priority, application Germany, Sept. 15, 1959,
A 32,859
9 Claims. (Cl. 83—210)

The present invention relates to devices for cutting strips at selected intervals.

For example, when a series of photographic prints are made on a strip of suitable paper, it is necessary to cut the strip between the several prints so as to separate the photographs from each other.

In devices of this type it is essential to have on the one hand a means for advancing the strip longitudinally and on the other hand a means for cutting across the strip. These two means must be operated alternately. Thus, while the cutting means is idle the strip is fed by a certain distance, and while the feeding means is idle and the strip is stationary the cutting means operates to cut across the strip. It is conventional in machines of this type to provide a pair of entirely independent electric motors for driving the cutting means and the feed means, and as a result not only is the structure very complex but in addition it is quite large.

One of the objects of the present invention is to provide a device of the above type which requires but a single driving motor so that in this way not only is the structure considerably simplified but in addition it is far more compact and requires much less space.

Another object of the present invention is to provide a device of the above type with a single driving motor which at the same time is fully automatic in its alternate actuation of the cutting means and strip-advancing means, which is to say the feed means for advancing the strip.

It is also an object of the present invention to provide a device of the above type with very simple transmissions which are only one-step transmissions for transmitting the drive from the single drive motor on the one hand to the cutting means and on the other hand to the feed roll means which feeds the strip, so that by reason of these one-step transmissions the structure also is considerably simplified and rendered extremely compact.

An additional object of the present invention is to provide a structure of the above type with a brake means which is engaged to positively stop the advancing of the strip only during the time that the cutting means is actuated. This is in contrast with structures where such a brake is always engaged so that when the feed roll means is actuated it is necessary to overcome the force of the brake means.

Still another object of the present invention is to provide a device of the above type with an electrical control circuit which automatically actuates the feed roll means when the strip cutting means reaches a position of rest and which automatically actuates the cutting means when the feed roll means had advanced the strip through a predetermined distance.

It is also an object of the present invention to provide a structure capable of accomplishing all of the above objects and at the same time composed of simple, rugged elements which are very reliable in operation.

With the above objects in view the present invention includes, in a device for cutting a strip at selected intervals, a single driving motor and first, second, and third shafts, the first shaft being operatively connected to the driving motor to be driven thereby, the second shaft being operatively connected with a feed roll means for advancing the strip, and the third shaft being operatively connected with a cutting means for cutting the strip. A pair of clutch means cooperate respectively with the first and second shafts and with the first and third shafts for respectively transmitting the drive from the first to the second shaft and from the first to the third shaft when the pair of clutch means are energized, and also in accordance with the present invention a means is provided for alternately engaging this pair of clutch means so that in this way the second and third shafts are alternately rotated so as to alternately operate the feed roll means and the cutting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a wiring diagram illustrating parts of the electrical control structure of FIG. 4.

Figure 1:
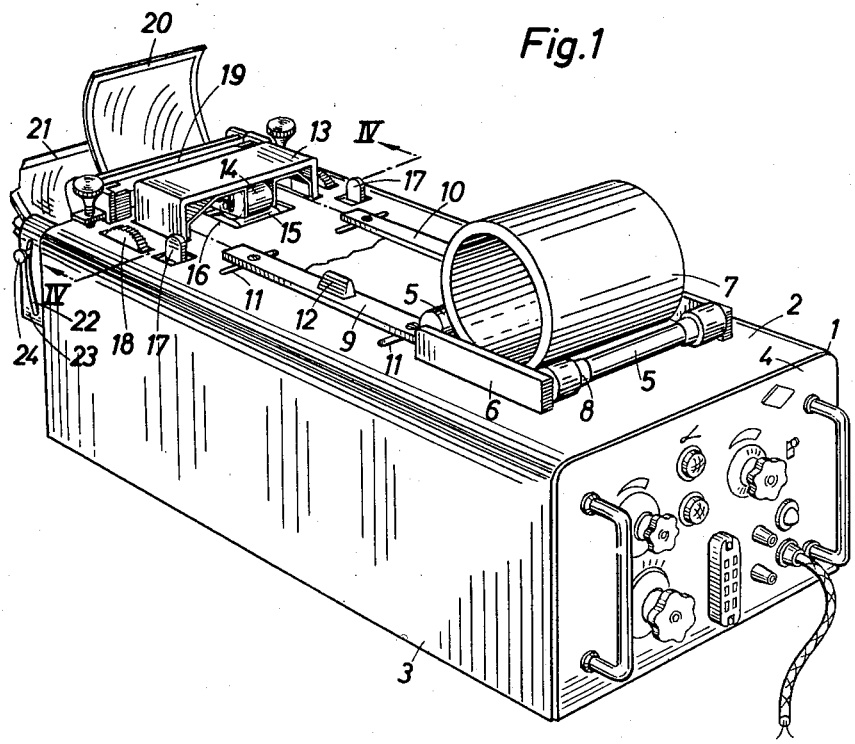
FIG. 1 is a perspective illustration of a machine according to the present invention.

Referring now to FIG. 1, there is illustrated therein the housing 1 for a machine constructed in accordance with the present invention. This housing includes an upper cover 2, and a pair of side walls 3, of which one is visible in FIG. 1. This pair of side walls 3 are releasably connected in any suitable way with the remainder of the housing, so that in this way the parts which are located in the interior of the housing are easily accessible, these parts including drive elements and the like which are carried by the housing in the interior thereof. The electrical switch elements are carried by an end wall 4 of the housing which can be inserted into an open end of the housing to the position shown in FIG. 1 and which can also be removed from the housing. Within the housing are located suitable plugs which cooperate with mating plug elements carried by the wall 4 to complete the circuit when the wall 4 is mounted in the position illustrated in FIG. 1 closing the end of the housing which is visible in FIG. 1.

A pair of stepped rolls 5 are parallel to each other and supported for rotation by the pair of brackets 6 which are carried by the cover 2 at the upper face thereof, as is evident from FIG. 1. Shown in FIG. 1 is a roll 7 of printing paper having photographs already printed thereon, and as is apparent from FIG. 1 the roll 7 rests on the rolls 5 and is maintained by the brackets 6 from lateral displacement. The stepped rolls 5 are provided with shoulders 8 so as to accommodate rolls of paper of lesser width than the roll 7 illustrated in FIG. 1, these shoulders 8 in this case engaging the edges of the paper to prevent lateral movement thereof. A pair of guide strips 9 and 10 are carried by the cover 2 spaced slightly from the upper surface thereof, and these strips overlie the side edge portions of the strip of paper 7 so as to guide the latter for movement along the upper face of the cover 2 during feeding of the paper 7 longitudinally while the paper is unwound. The guide strips 9 and 10 are respectively carried by pins which extend respectively through the lateral slots 11 formed in the cover 2, these pins being connected beneath the cover 2 to a suitable, known structure which maintains the strips 9 and 10 at equal distances from the central longitudinal axis of the cover 2, and the strip 9 carries a manually-engageable projection 12 enabling the operator to move the strip 9 laterally of the cover 2, and the structure which interconnects the pins which carry the strips 9 and 10 guarantees that the strip 10 moves at all times equally and oppositely to the strip 9, so that it is only necessary to position the strip 9, the strip 10 being automatically positioned Thus, it is possible to adapt the lateral space between the guide strips 9 and 10 to the width of the strip of paper 7.

Adjacent its left end, as viewed in FIG. 1, the cover 2 carries a supporting bracket 13 of inverted U-shape, and this bracket 13 participates in the support of a roll 14 which forms part of a feed roll means which feeds the strip 7 through the predetermined intervals between the cuttings of the strip 7. The feed roll means includes in addition to the roll 14 a lower roll 15 which is located within the housing 1 and which has an upper peripheral portion extending into an opening 16 formed in the cover 2. The roll 15 is driven by the structure described below, while the roll 14 is simply a counter-roll urged downwardly against the roll 15. The bracket 13 is releasably locked to the housing, and a handle 17 is available, extending through a cutout of the cover 2, for locking the bracket 13 to the machine or for unlocking the bracket 13 so that it can be removed together with the roll 14. The cover plate 2 also carries a pair of contact assemblies which are only shown diagrammatically in FIG. 4, described below, and which are longitudinally shiftable in a known way along the path of movement of the strip 7 so as to have a predetermined location along this path. A pair of hand wheels 18 are turnably supported by the structure within the housing 1 and respectively extend through a pair of cutouts in the cover plate 2 respectively located at opposite sides of the bracket 13, these hand wheels 18 being manually turnable for respectively adjusting the positions of the pair of contact assemblies.

Located immediately subsequent to the bracket 13 in the direction of movement of the strip of paper 7 is a cutting means 19. This cutting means 19 is periodically actuated in a manner described below for cutting across the strip 7, and the individual photographs 20 which are in this way separated from the strip 7 fall onto a receiving plate 21 located at the left end of the housing 1 as viewed in FIG. 1. This receiving plate 21 is inclined upwardly. It is pivotally supported at its end adjacent to the housing 1, and the side edges of the receiving plate 21 are respectively threaded to a pair of screws 24 which respectively extend through arcuate slots 22 formed in a pair of walls 23 carried by the end of the housing 1 adjacent the cutting means 19 and respectively located on opposite sides of the receiving plate 21, so that by loosening the screws 24 it is possible to adjust the angular position of the plate 21, and then these screws 24 can be tightened so as to retain the plate 21 in the selected angular position thereof.

Figure 2:
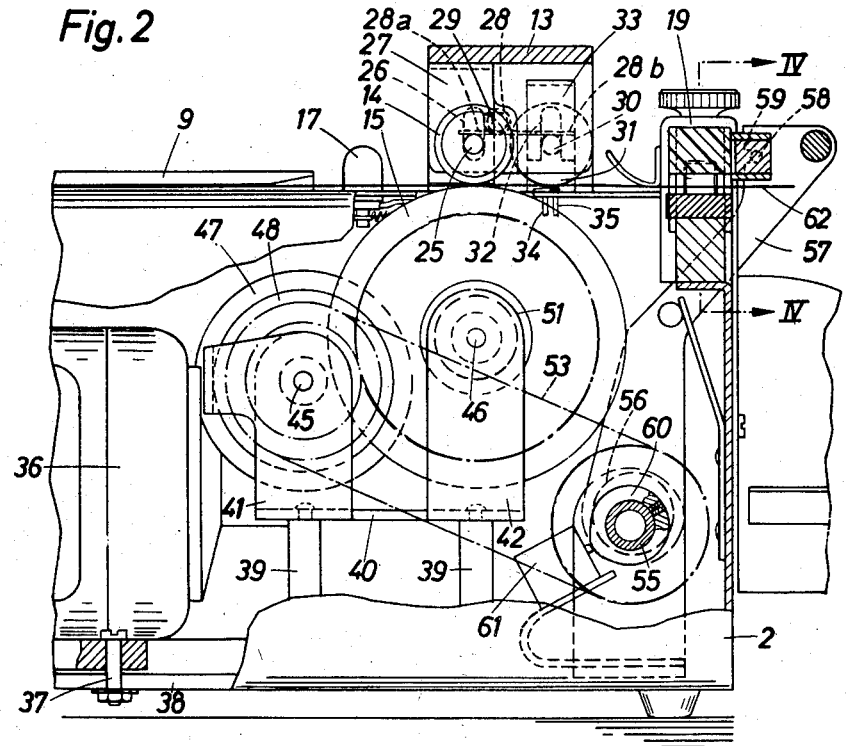
FIG. 2 is a fragmentary longitudinal sectional elevation of that end portion of the machine where the cutting and feed roll means are located as well as the structure actuating the same.

As may be seen from FIG. 2, the shaft 25 which carries the counter-roll 14 extends through substantially vertical slots 26 formed in a pair of carrier elements 27 which are in turn fixedly carried by the bracket 13. A pair of wire or leaf springs 28 are wound intermediate their ends around the stationary pin 29 carried by the bracket 13, or by the carrier elements 27, and these wire springs 28 press with one of their ends 28a downwardly on the shaft 25 so as to urge the counter-roll 14 downwardly against the driven feed roll 15. The other ends 28b of the springs 28 press downwardly against shaft 30 of a roll 31 which engages the paper strip 7 to urge the side edges thereof downwardly against the pair of contact assemblies referred to above for guaranteeing actuation of the circuit of FIG. 4, as described below. The rolls 31 have their shafts 30 guided in vertical notches extending upwardly from the bottom ends of brackets similar to the bracket 13. FIG. 2 illustrates one of these brackets 33 and the vertical notch 32 formed therein. The pair of brackets 33 are respectively carried by the pair of contact assemblies referred to below so as to be longitudinally shiftable therewith when the members 18 are turned by the operator for adjusting the position of the contact assemblies. FIG. 2 illustrates a pair of contacts 34 and 35 of one of these contact assemblies. One of the contacts, such as the contact 34 is grounded, while the other is connected with the electrical circuit.

Figure 3:
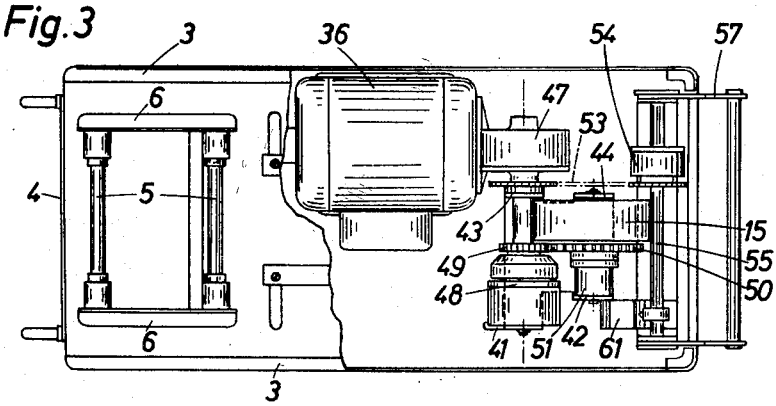
FIG. 3 is a partly broken away top plan view of the machine of FIG. 1.
Figure 4:
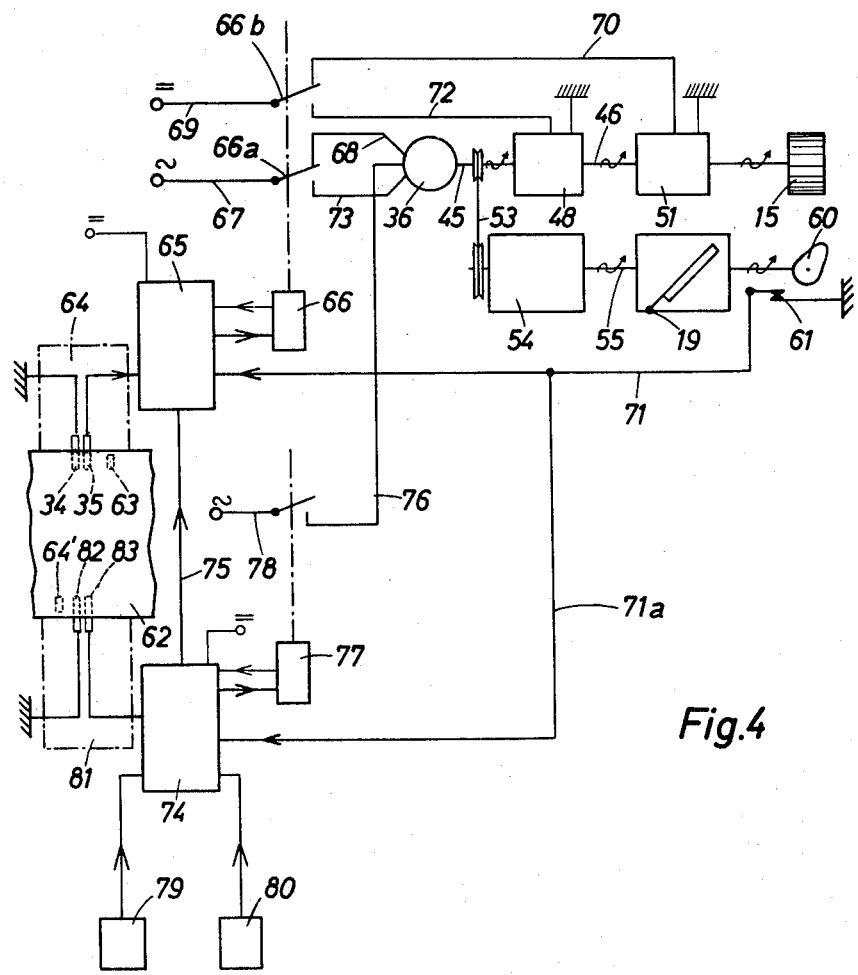
FIG. 4 is a wiring diagram illustrating the electrical control structure of the invention in a diagrammatic manner.

In accordance with the present invention, there is provided a single reversible electric motor 36 shown in FIGS. 2 and 3 and diagrammatically illustrated in FIG. 4. As is apparent from FIG. 2, the housing includes a base plate 38, and screws 37 serve to fasten the motor 36 to the base plate. Furthermore, the base plate fixedly carries a plurality of posts 39 which are fixedly connected at their upper ends to a supporting plate 40 provided with four upwardly extending ears 41–44, and, as is apparent from FIG. 3, the ears 41 and 43 are aligned with each other, while the ears 42 and 44 are also aligned with each other. The pair of upwardly directed ears 41 and 43 serve to support for rotation a shaft 45, while the pair of ears 42 and 44 support for rotation a shaft 46 which extends between these ears 42 and 44, the shaft 46 being parallel to the shaft 45. A worm and wormwheel transmission 47 serves to transmit the drive from the reversible motor 36 to the shaft 45, so that this latter shaft turns in one direction or the other depending upon the direction of rotation of the reversible motor 36. The shaft 45 carries an electromagnetic clutch means 48 which, when it is energized, serves to transmit the drive from the shaft 45 to a gear 49 which is freely turnable on the shaft 45 and which turns with the shaft 45 only when the electromagnetic clutch 48 is energized. Such electromagnetic clutches are well-known. The gear 49 meshes with a gear 50 fixedly carried by the shaft 46, so that in this way a one-step transmission is provided between the shafts 45 and 46 for transmitting a drive from the shaft 45 to the shaft 46 only when the electromagnetic clutch means 48 is engaged. The shaft 46 fixedly carries the feed roll 15 so that the feed roll means is actuated only when the electromagnetic clutch means is engaged, and the shaft 46 also carries an electromagnetic brake 51 which acts positively on the shaft 46 to prevent rotation thereof when the electromagnetic brake 51 is energized. This brake structure 51 is carried by the ear 42 of the plate 40 and freely surrounds the shaft 46 which is thus free to rotate as long as the brake 51 is not energized. However, when this brake is energized it acts on the shaft 46 to positively prevent rotation thereof. Such electromagnetic brakes also are conventional and well-known.

A chain drive 53 transmits the drive from the shaft 45 to a third shaft 55 through an overrunning clutch means 54 carried by the shaft 55. Thus, the clutch means 54 includes a sprocket wheel while a second sprocket wheel is fixedly carried by the shaft 45, and the single endless sprocket chain extends around the pair of sprocket wheels so as to form the chain drive 53 which again is a one-step transmission for transmitting the drive from the shaft 45 to the rotary shaft 55 through the overrunning clutch means 54 which is carried by the shaft 55. When the clutch means 54 is driven in one direction from the motor 36 the clutch means 54 is disengaged and will not drive the shaft 55, while when the clutch means 54 is driven in the opposite direction, when the motor 36 is reversed, then the clutch means 54 is engaged and the shaft 55 will be driven. This shaft 55 is supported for rotation about its axis by a bracket carried by the base plate 38, and the shaft 55 fixedly carries a pair of discs 56 whose centers are aligned with each other but displaced from the axis of the shaft 55, so that these discs 56 are eccentrically mounted on the shaft 55 for rotation therewith. The eccentric discs 56 respectively turn in mating openings respectively formed in a pair of connecting rods 57 which extend through suitable vertical cutouts in the right end wall of the housing, as viewed in FIG. 2, so that the connecting rods 57 are free to move vertically up and down through a predetermined stroke during each revolution of the shaft 55, the eccentric discs 56 turning with the shaft 55 so as to produce the vertical movement of the connecting rods 57 from an upper rest position down through a cutting stroke and then again back up to their rest position. The cutting means 19 includes a cutting element which is guided for vertical movement by suitable guide brackets, and the cutting element is moved up and down by an elongated bar 59 extending between the connecting rods 57 at their upper end portions and connected with the connecting rods 57 through the pin-and-slot connections 58. As is apparent from FIG. 2, the connecting rods 57 carry intermediate their ends pins which are respectively engaged by leaf springs which urge the connecting rods 57 to turn around the eccentric discs 56 in a counterclockwise direction, as viewed in FIG. 2, so that in this way the right ends of the slots of the pin-and-slot connections 58 are maintained in engagement with the pins of these connections, these pins being carried by the ends of the bar 58 while the slots are formed in the upper ends of the connecting rods 57, and in this way as the connecting rods 57 move up and down their movement is transmitted to the cutting means 19 for actuating the same.

The shaft 55 also fixedly carries a cam 60 which cooperates with a switch 61 of the electrical circuit in a manner described below.

FIG. 4 illustrates at 62 the strip of photographic printing paper or the like drawn from the roll 7. With a suitable pencil or by suitable marking wheels known in the art contact marks 63 are formed along the upper edge of strip 62, as viewed in FIG. 4, at intervals corresponding to those at which the several cuts are to be made by the cutting means 19. These marks 63 are electrically conductive, and the contact assembly 64 includes the pair of contact elements 34 and 35 already referred to above and located in the path of movement of the electrically conductive marks 63. Thus, as each of these marks 63 engages the contacts 34 and 35, each of these electrically conductive marks will bridge the gap between the contacts 34 and 35 and thus complete the circuit therebetween. A second electrically conductive mark 64' is provided on the other side of the strip 62 and is adapted to cooperate with the contacts 82 and 83 of the second contact assembly 81.

As was indicated above, the contact assemblies 64 and 81 have their positions along the path of movement of the strip 62 respectively set by the wheels 18 which are accessible to the operator for this adjustment.

Thus, the contact assembly 64 senses when a mark 63 reaches a predetermined position at which the contacts 34 and 35 are located. When the contacts 34 and 35 are bridged by the electrically conductive mark 63, an impulse is transmitted from the assembly 64 to an electrical control device 65 which in this way actuates a relay 66 to place the contacts 66a and 66b thereof in the position illustrated in FIG. 4. The relay has a normal position of rest where the contacts 66a and 66b engage the elements 72 and 73, and then when the relay is energized it moves these contacts from their normal position to the other position. The contact 66a serves to connect a source of alternating current from the conductor 67 to the terminal 68 of the electric motor 36 so as to drive the latter in that direction which operates the overrunning clutch 54 in the direction which causes the overrunning clutch 54 to become engaged and thus rotate the shaft 55. In this way, the cutting operation is initiated when each mark 63 bridges the gap between the contacts 34 and 35. Simultaneously with the engagement of terminal 68 of the motor 36 by the relay contact 66a the conductor 70 is engaged by the other relay contact 66b which serves to provide direct current through the lead 69 to the conductor 70 so as to feed this direct current to the electromagnetic brake means 51 which thus becomes energized so as to positively stop the rotation of the feed roll means 14, 15. The shaft 55 is driven through the engaged overrunning clutch means 54 so as to actuate the cutting means 19 in the manner above, and at the end of a single revolution when the shaft 55 has again reached the angular position at which the cutting means is at rest, the cam 60 will engage the switch 61 so as to close the latter and thus provide through the conductor 71 an impulse to the electrical control device 65 which actuates the relay 66 to move the contacts 66a and 66b thereof to the position where the direct current supplied through the conductor 69 is now electrically connected with the conductor 72, while the alternating current supplied through the conductor 67 is now supplied to the terminal 73 of the motor 36. The remaining terminal 76 of the motor 36 is connected through a normally closed switch of a relay 77 with the other line 78 which forms with the line 67 the pair of lines from which the alternating current is derived. This impulse which is derived by closing of the switch 61 serves thus to reverse the direction of rotation of the motor 36 so as to drive the overrunning clutch 54 in an opposite direction which disengages this clutch and thus stops the rotation of the shaft 55 so that the cutting means is no longer actuated. In addition, the electromagnetic clutch 48 is energized so that when the direction of the motor 36 is reversed the drive will be transmitted to the feed roll 15. At this time the electric motor 36 turns in a direction which rotates the roll 15 in a clockwise direction, as viewed in FIG. 2, so as to advance the strip 62 to the right, as viewed in FIG. 2. Of course, as soon as the contact 66b moved away from the line 70 into engagement with the line 72 the electromagnetic brake 51 was disengaged, and of course the electromagnetic clutch 48 was engaged immediately after this disengagement of the brake 51 so that in this way the feed roll means was released to be driven from the electric motor 36 upon energizing and engagement of the electromagnetic clutch 48. This feeding of the strip 62 continues until the next mark 63 short circuits the contacts 34 and 35 in order to initiate the next cutting operation as described above.

A second electrical control assembly 74 is provided for stopping and starting the control assembly 65 and the motor 36. The control assembly 74 is electrically connected directly with the control assembly 65 through the conductor 75, and this control assembly 74 is also connected electrically with the relay 77 which operates the switch connected to the third terminal 76 of the motor 36. A manually operable starting switch 79 is available to the operator to be manually closed for starting the operation of the entire device, and the operation of the entire device may be manually terminated at any time by manual actuation of a second switch 80 which is electrically connected also with the control assembly 74. The control assembly 74 may also be actuated in order to stop the operation of the machine by way of the contact assembly 81 which includes the pair of contacts 82 and 83 which are adapted to be bridged by the electrically conductive mark 64' for closing the circuit between the contacts 82 and 83 and thus actuating the control assembly 74 for stopping the operation of the entire machine. A series of orders each of which includes a predetermined number of photographs will ordinary be located one after the other on a given strip which forms the roll 7, and at the end of each order which will include a predetermined number of photographs the mark 64' will be placed, so that when this mark bridges the contacts 82 and 83 the structure senses the end of the series of photographs of a particular order. Thus, when a series of photographs have been cut from the strip to complete a given order, the mark 64' will engage the contacts 82 and 83 so as to stop in a fully automatic manner the operation of the machine, and at this time the inclination of the receiving plate 21 may again be adjusted to accommodate the following order. Of course, the photographs which rest on the plate 21 are removed therefrom before the cutting of the strip of the next order is commenced. When the cutting of the photographs of the next order is to be initiated, the operator merely actuates the switch 79 by depressing a suitable key, for example, so as to start the operation of the entire machine.

Provision is also made for terminating the feeding of the strip after a predetermined length of strip has been advanced without any cutting operations taking place. For example, if marks such as the mark 63 are not on the strip, then after a length of the strip equal, for example, to a meter or so has been advanced the structure will operate automatically to shut off the machine. For this purpose the control assembly 74 includes an unillustrated timing mechanism which is connected through the conductor 71a with the conductor 71. Each time the switch 61 is closed there is provided through the conductors 71 and 71a an impulse which, for example, charges a condenser of the timing mechanism so as to maintain the latter in operation. However, if after a certain length of time the condenser does not receive another charge then of course the timing mechanism will run through the selected period of time for automatically actuating the assembly 74 to terminate the operation of the machine.

Referring now to FIG. 5 which shows the construction of the electrical control device 66, when the mark 63 on the paper 62 bridges the contacts 34 and 35, a negative pulse is provided at the resistor 101 and is transmitted to the cathode follower 102 at whose working resistance 103 there is the same negative pulse. Through the coupling condenser 104 this pulse reaches a first grid 105a of a bistable multivibrator 105 of any suitable type known in the art. The multivibrator operates in its first stable state to produce an excitation of the relay 66 which thus initiates the above-described cutting cycle. At the end of the cutting cycle the cam 60 closes the switch 61 and through the lead 71 sets into operation a suitable time delay circuit 106, such as, for example, an RC circuit, which then delivers a negative pulse to the second grid 105b of the bistable multivibrator, so that the multivibrator operates in its second stable state and the relay 66 returns to its rest position and initiates a feeding cycle. The lead 75 from the control assembly 74 also provides a negative pulse at the grid 105b if the switch 66 is not closed within a period of five seconds, so that the motor 36 and the relay 77 are protected from overloads, if, for example, something goes wrong with the operations. The control assembly 74 is constructed analogously to the electrical control device 65 and cooperates with the relay 77 for stopping and starting the feed.

As is apparent from the above description, the initiating of the feeding of the strip which is to be cut is actuated upon closing of the switch 61 by the cam 60 when the shaft 55 again reaches an angular position where the cutting means 19 is at rest, and the initiation of the operation of the cutting means takes place when a mark 63 bridges the gap between the contacts 34 and 35. These alternate operations are brought about from the single electric motor 36 which drives the shaft 45 which in turn through a pair of one-step transmissions transmits the drive alternately to the shafts 46 and 55 depending upon whether the electromagnetic clutch 48 is energized or whether the overrunning clutch 54 is engaged.

Thus, because of the single reversible electric motor 36, as well as because of the one-step transmissions, the structure is exceedingly simple and at the same time extremely compact. As is apparent from FIG. 3, the electromagnetic clutch 48, the electromagnetic brake 51 and the overrunning clutch 54 are laterally offset with respect to each other so as to be staggered laterally along the parallel shafts 45, 46 and 55.

It will be understood that each of the elements described above, or two or more together, may also find a useful application in other types of cutting devices differing from the types described above.

While the invention has been illustrated and described as embodied in strip cutting devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for cutting a strip at selected intervals, in combination, feed means for feeding a strip to be cut; cutting means for cutting a strip; a single reversible electric motor; first, second, and third rotary shafts, said first shaft being operatively connected to said motor to be driven thereby alternately in opposite directions, said second shaft being operatively connected with said feed means which feeds a strip which is to be cut, and said third shaft being operatively connected with said cutting means for cutting the strip, electronmagnetic clutch means operatively connected with said second and first shafts for transmitting a drive from said first to said second shaft to operate said feed means when said electromagnetic clutch means is engaged; overrunning clutch means operatively connected with said first and third shafts for actuating said third shaft to operate said cutting means when said overruning clutch means is engaged upon rotation of said first shaft in only one of said opposite directions; and control means operatively connected with said electromagnetic means and said motor for periodically reversing said electric motor to alternately drive said first shaft in said opposite directions and for energizing said electromagnetic means only during rotation of said first shaft in the other of said opposite directions, whereby said feed means and said cutting means will be alternately actuated.

2. In a device for cutting a strip at selected intervals, in combination, a single reversible electric motor; a first shaft operatively connected to said electric motor to be driven thereby in opposite directions; feed roll means including a second shaft, said feed roll means feeding a strip which is to be cut; cutting means for cutting the strip, said cutting means including a third shaft; electromagnetic clutch means operatively connected with said first and second shafts for transmitting a drive from said first to said second shaft when said electromagnetic clutch means is engaged, for operating said feed roll means when said electromagnetic clutch means is engaged; overrunning clutch means operatively connected with said first and third shafts for transmitting a drive from said first to said third shaft to operate said cutting means when said first shaft rotates in that one of said opposite directions in which said overrunning clutch means is engaged; electromagnetic brake means engaging said feed roll means for positively stopping the operation thereof when said electromagnetic brake means is energized; and control means operatively connected with said electric motor, said electromagnetic clutch means, and said electromagnetic brake means for reversing said electric motor, for alternately energizing said electromagnetic clutch means and said electromagnetic brake means and for operating said third shaft through said overrunning clutch means from said electric motor when said electromagnetic brake means is engaged and said electromagnetic clutch means is disengaged, said control means energizing said electromagnetic clutch means and de-energizing said electromagnetic brake means when said first shaft is driven by said electric motor in a direction opposite to that in which said overrunning clutch means is engaged.

3. In a device for cutting a strip at selected intervals, in combination, feed roll means for feeding a strip; cutting means for cutting a strip; a single reversible electric motor; a first shaft operatively connected to said motor to be driven thereby; a second shaft operatively connected with said feed roll means for operating the latter when said second shaft turns; a third shaft operatively connected with said cutting means for actuating the cutting means when said third shaft rotates; a pair of clutch means respectively carried by said first and third shafts and a transmission means cooperating with said second shaft and the clutch means carried by said first shaft for transmitting a drive from said first to said second shaft to operate said feed roll means when the clutch means carried by said first shaft is engaged, said third shaft operating to actuate the cutting means when the clutch means carried by said third shaft is engaged; brake means carried by said second shaft and cooperating with said feed roll means to positively stop the operation thereof when said brake means is engaged; and control means operatively connected to said electric motor for reversing the latter, said pair of clutch means being respectively engaged when said electric motor rotates in opposite directions so that in one direction of rotation of said electric motor said feed roll means is operated and in the other direction said cutting means is operated.

4. In a device for cutting a strip at selected intervals, in combination, feed roll means for feeding a strip; cutting means for cutting a strip; a single reversible driving motor; first, second, and third shafts, said first shaft being operatively connected to said driving motor to be driven thereby, said second shaft cooperating with said feed roll means for actuating the latter when said second shaft rotates, and said third shaft cooperating with said cutting means for actuating the cutting means when said third shaft rotates; a first one-step transmission means operatively connected with said first and second shafts for transmitting a drive from said first to said second shaft to actuate said feed roll means; a second one-step transmission means cooperating with said first and third shafts for transmitting a drive from said first to said third shaft for actuating said cutting means; and control means operatively connected to said motor for periodically reversing the latter to drive said first shaft first in one direction and then in an opposite direction, said first transmission means transmitting said drive from said first to said second shaft when said first shaft turns in said one direction and said second transmission means transmitting a drive from said first to said third shaft when said first shaft is driven in said opposite direction.

5. In a device for cutting a strip at selected intervals, in combination, feed roll means for feeding a strip; cutting means for cutting a strip; a single reversible electric motor; first, second and third shafts, said first shaft being operatively connected to said motor to be driven thereby in opposite directions, said second shaft being operatively connected with said feed roll means for feeding a strip which is to be cut when said second shaft rotates, and said third shaft being operatively connected with said cutting means for actuating the latter when said third shaft rotates, said third shaft having a predetermined angular position when the cutting means actuated thereby is in a position of rest; overrunning clutch means operatively connected with said first and third shafts for transmitting a drive from said first to said third shaft when said first shaft is driven by said motor in that one of said opposite directions in which said overrunning clutch means is engaged; electromagnetic clutch means operatively connected with said first and second shafts for transmitting a drive from said first to said second shaft to actuate said feed roll means when said electromagnetic clutch means is engaged; circuit means cooperating with said electric motor and said electromagnetic clutch means for alternately driving said first shaft in said one direction to energize said overrunning clutch means and driving said first shaft in the other one of said opposite directions while simultaneously energizing said electromagnetic clutch means; and means carried by said third shaft and cooperating with said circuit means for actuating the latter to energize said electromagnetic clutch means and reverse said electric motor to drive said first shaft in said other direction when said third shaft reaches said angular position thereof.

6. In a device for cutting a strip at selected intervals, in combination, feed roll means for feeding a strip; cutting means for cutting a strip; a single reversible electric motor; first, second and third shafts, said first shaft being operatively connected to said motor to be driven thereby in opposite directions, said second shaft being operatively connected with said feed roll means for feeding a strip which is to be cut when said second shaft rotates, and said third shaft being operatively connected with said cutting means for actuating the latter when said third shaft rotates, said third shaft having a predetermined angular position when the cutting means actuated thereby is in a position of rest; overrunning clutch means operatively connected with said first and third shafts for transmitting a drive from said first to said third shaft when said first shaft is driven by said motor in that one of said opposite directions in which said overrunning clutch is engaged; electromagnetic clutch means operatively connected with said first and second shafts for transmitting a drive from said first to said second shaft to actuate said feed roll means when said electromagnetic clutch means is engaged; circuit means cooperating with said electric motor and said electromagnetic clutch means for alternately driving said first shaft in said one direction to energize said overrunning clutch means and driving said first shaft in the other one of said opposite directions while simultaneously energizing said electromagnetic clutch means; and means carried by said third shaft and cooperating with said circuit means for actuating the latter to energize said electromagnetic clutch means and reverse said electric motor to drive said first shaft in said other direction when said third shaft reaches said angular position thereof, said means for actuating said circuit means to energize said electromagnetic clutch means including a switch of said circuit means and a cam carried by said third shaft and closing said switch when said third shaft is in said angular position thereof.

7. In a device for cutting a strip or the like, in combination, feed means for feeding a strip; cutting means for cutting a strip; a reversible electric motor adapted to rotate either in one or the opposite direction; first shaft means operatively connected to said motor and driven thereby in one or said opposite direction; second shaft means operatively connected with said feed means for feeding a strip which is to be cut; third shaft means operatively connected with said cutting means for cutting the thus-fed strip; first clutch means operatively connecting said first and second shafts when said first clutch means is actuated, so as to transmit the drive from said motor through said first and second shafts to said feed means during actuating of said first clutch means; second clutch means operatively connecting said first and third shafts when said second clutch means is actuated so as to transmit a drive from said motor through said first and third shafts to said cutting means during actuation of said second clutch means; and control means cooperating at least with said motor for periodically reversing the latter and with said first clutch means for actuating the latter only when said motor rotates in said one direction so that said second clutch means transmits the drive from said motor to said cutting means only when said motor rotates in said opposite direction, whereby said motor rotates in different directions when driving said feed means and cutting means, respectively.

8. In a device for cutting a strip, in combination, a reversible electric motor; a pair of strip treating means consisting of a strip feeding means and a strip cutting means; at least one overrunning clutch means operatively connected to said motor and one of said strip treating means for automatically transmitting a drive from said motor to said one strip treating means when said reversible motor turns in one of a pair of opposite directions and control means operatively connected to said motor for periodically reversing the latter to drive the other of said strip treating means when said motor turns in the opposite direction.

9. In a device for cutting a strip, in combination, a reversible electric motor; a first shaft operatively connected to said motor to be driven thereby in opposite directions; a second shaft parallel to said first shaft; feed roll means carried by said second shaft for rotation therewith and adapted to feed a strip; a transmission extending between said first and second shafts and an electromagnetic clutch operatively connected to said transmission for actuating the latter to transmit a drive from said first to said second shaft when said clutch is energized, said clutch being carried by said first shaft and overlapping said feed roll means; a third shaft parallel to said first and second shafts; overrunning clutch means operatively connected to said first and third shafts for automatically driving said third shaft when said first shaft rotates in one of said opposite directions; cutter means operatively connected to said third shaft to be actuated thereby for cutting a strip only when said first shaft rotates in said one direction, said cutter means having a predetermined operating cycle; and control means actuated by said cutter means when the latter reaches the end of said operating cycle thereof for reversing the direction of rotation of said motor and for energizing said electromagnetic clutch, so that said first shaft will then rotate in the other of said opposite directions and the drive will be transmitted to said feed roll means, said control means after a given interval again reversing said motor for driving said cutter means through said overrunning clutch means.

References Cited by the Examiner
UNITED STATES PATENTS

| | | | |
|---|---|---|---|
| 1,814,890 | 7/31 | Biagosch | 83—210 |
| 2,389,381 | 11/45 | McLennan | 192—.02 X |
| 2,514,578 | 7/50 | Heller et al. | |
| 2,742,963 | 8/56 | Klauss et al. | 83—210 |
| 3,028,767 | 4/62 | Moore. | |

LEON PEAR, *Primary Examiner.*

HUNTER C. BOURNE, Jr., CARL W. TOMLIN,
*Examiners.*